United States Patent
Zhan et al.

(10) Patent No.: US 12,370,827 B2
(45) Date of Patent: Jul. 29, 2025

(54) ALUMINUM WHEELS AND METHODS FOR CASTING ALUMINUM WHEELS USING HIGH SCRAP ALUMINUM CONTENT

(71) Applicant: GM GLOBAL TECHNOLOGY OPERATIONS LLC, Detroit, MI (US)

(72) Inventors: Henry Zhan, Shanghai (CN); Libing Liu, Shanghai (CN); Jianfeng Wang, Shanghai (CN); Yunhu Zhang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/358,577

(22) Filed: Jul. 25, 2023

(65) Prior Publication Data

US 2024/0227433 A1   Jul. 11, 2024

(30) Foreign Application Priority Data

Jan. 5, 2023   (CN) .......................... 202310011995.0

(51) Int. Cl.

| | |
|---|---|
| *B60B 3/00* | (2006.01) |
| *B22D 18/04* | (2006.01) |
| *B22D 21/00* | (2006.01) |
| *B22D 21/04* | (2006.01) |
| *B60B 3/06* | (2006.01) |
| *C22B 21/00* | (2006.01) |
| *C22C 1/02* | (2006.01) |
| *C22C 1/03* | (2006.01) |
| *C22C 21/02* | (2006.01) |

(52) U.S. Cl.
CPC .............. *B60B 3/00* (2013.01); *B22D 18/04* (2013.01); *B22D 21/00* (2013.01); *B22D 21/007* (2013.01); *B22D 21/04* (2013.01); *B60B 3/06* (2013.01); *C22B 21/0092* (2013.01); *C22C 1/026* (2013.01); *C22C 1/03* (2013.01); *C22C 21/02* (2013.01); *B60B 2310/202* (2013.01); *B60B 2360/104* (2013.01)

(58) Field of Classification Search
None
See application file for complete search history.

(56) References Cited

U.S. PATENT DOCUMENTS

| | | | | |
|---|---|---|---|---|
| 2016/0250683 | A1* | 9/2016 | Wang ....................... | C22C 21/18 |
| | | | | 420/532 |
| 2018/0057913 | A1* | 3/2018 | Hu ............................ | C22C 21/02 |
| 2019/0136349 | A1* | 5/2019 | Breton ..................... | C22F 1/043 |

FOREIGN PATENT DOCUMENTS

| | | |
|---|---|---|
| CN | 113549790 A | 10/2021 |
| CN | 114438374 A | 5/2022 |
| WO | WO-2019034837 A1 | 2/2019 |

OTHER PUBLICATIONS

Office Action dated Dec. 1, 2023 from German Patent Office for German Patent No. 10 2023 105 216.0; 5 pages.

* cited by examiner

*Primary Examiner* — George Wyszomierski
*Assistant Examiner* — Janell C Morillo

(57) ABSTRACT

A method for casting an aluminum wheel comprises preparing a melt having a predetermined chemistry and including silicon in a range from 8.5 to 10% mass and aluminum; degassing and refining the melt; adding a grain refiner including aluminum-titanium-vanadium-boron (Al—Ti—V—B) and a master alloy to the melt; and casting the aluminum wheel.

20 Claims, 5 Drawing Sheets

ALUMINUM WHEELS AND METHODS FOR CASTING ALUMINUM WHEELS USING HIGH SCRAP ALUMINUM CONTENT

CROSS-REFERENCE TO RELATED APPLICATIONS

This application claims the benefit of Chinese Patent Application No. 202310011995.0, filed on Jan. 5, 2023. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to aluminum wheels, and more particularly to methods of casting aluminum wheels using scrap aluminum.

Vehicles include wheels that may be cast from aluminum (Al). The wheels include a hub that is directly connected to the vehicle. Spokes that extend radially outwardly from the hub and connect to a rim. The tire is mounted to the rim. The aluminum wheels can be machined or cast. When the aluminum wheels are cast, manufacturers need to ensure that the rims, spokes, and hubs of the aluminum wheel are strong. The spokes are generally the most critically stressed portion of the aluminum wheels due to the smaller cross-sectional areas of the spokes.

SUMMARY

A method for casting an aluminum wheel comprises preparing a melt having a predetermined chemistry and including silicon in a range from 8.5 to 10% mass and aluminum; degassing and refining the melt; adding a grain refiner including aluminum-titanium-vanadium-boron (Al—Ti—V—B) and a master alloy to the melt; and casting the aluminum wheel.

In other features, the melt comprises greater than 70% mass scrap aluminum. Casting the aluminum wheel includes tilt casting the aluminum wheel at a predetermined temperature in a range from 680° C. to 720° C. Casting the aluminum wheel includes low pressure die casting (LPDC) the aluminum wheel at a predetermined temperature in a range from 680° C. to 720° C. A die configured to cast the aluminum wheel is made of a tooling steel having a thermal conductivity greater than 32 W/mK in a temperature range from 200° C. to 600° C.

In other features, the melt includes greater than 300 parts per million vanadium. The melt further includes iron (Fe) in a range from 0.1 to 0.25% mass.

In other features, the melt further includes magnesium (Mg) in a range from 0.25 to 0.4% mass; copper (Cu) in a range from 0.01 to 0.2% mass; zinc (Zn) in a range from 0.01 to 0.2% mass; titanium (Ti) in a range from 0.01 to 0.2% mass; strontium (Sr) in a range from 10 ppm to 200 ppm; chromium (Cr) in a range from 0.01 to 0.2% mass; manganese (Mn) in a range from 0.01 to 0.2% mass; and vanadium (V) in a range from 0.03 to 0.05% mass.

In other features, the silicon (Si) is in a range from 8.5 to 9.5% mass.

In other features, the melt further includes magnesium (Mg) in a range from 0.25 to 0.4% mass; copper (Cu) in a range from 0.01 to 0.1% mass; zinc (Zn) in a range from 0.01 to 0.1% mass; titanium (Ti) in a range from 0.01 to 0.15% mass; strontium (Sr) in a range from 50 ppm to 200 ppm; chromium (Cr) in a range from 0.01 to 0.15% mass; manganese (Mn) in a range from 0.01 to 0.15% mass; and vanadium (V) in a range from 0.03 to 0.05% mass.

In other features, the aluminum wheel has an average secondary dendrite arm spacing (SDAS) in a range from 20 µm to 30 µm in a spoke region. The aluminum wheel has an average grain size in a range from 50 µm to 250 µm in a spoke region. The tensile sample cut from the spoke region of the aluminum wheel has a yield strength greater than 170 MPa and tensile elongation greater than 3%.

An aluminum wheel includes a hub, a rim, and a plurality of spokes connected the hub to the rim. The aluminum wheel is cast and includes silicon (Si) in a range from 8.5 to 10% mass; iron (Fe) in a range from 0.1 to 0.25% mass; and aluminum comprising greater than or equal to 70% mass scrap aluminum.

In other features, the aluminum wheel further includes magnesium (Mg) in a range from 0.25 to 0.4% mass; copper (Cu) in a range from 0.01 to 0.2% mass; zinc (Zn) in a range from 0.01 to 0.2% mass; titanium (Ti) in a range from 0.01 to 0.2% mass; strontium (Sr) in a range from 10 ppm to 200 ppm; chromium (Cr) in a range from 0.01 to 0.2% mass; manganese (Mn) in a range from 0.01 to 0.2% mass; and vanadium (V) in a range from 0.03 to 0.05% mass.

In other features, the silicon (Si) is in a range from 8.5 to 9.5% mass.

In other features, the aluminum wheel further includes magnesium (Mg) in a range from 0.25 to 0.4% mass; copper (Cu) in a range from 0.01 to 0.1% mass; zinc (Zn) in a range from 0.01 to 0.1% mass; titanium (Ti) in a range from 0.01 to 0.15% mass; strontium (Sr) in a range from 50 ppm to 200 ppm; chromium (Cr) in a range from 0.01 to 0.15% mass; manganese (Mn) in a range from 0.01 to 0.15% mass; and vanadium (V) in a range from 0.03 to 0.05% mass.

In other features, the aluminum wheel has at least one of an average secondary dendrite arm spacing (SDAS) of spoke region in a range from 20 µm to 30 µm; and an average grain size of spoke region in a range from 50 µm to 250 µm.

In other features, the aluminum wheel has at least one of a yield strength greater than 170 MPa; and an elongation to fracture greater than 3% mass.

In other features, the aluminum wheel has at least one of a yield strength greater than 200 MPa; and an elongation to fracture greater than 3% mass.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure relates to aluminum wheels and methods for casting aluminum wheels using high scrap aluminum content. The methods for casting aluminum wheels according to the present disclosure use increased silicon content, a grain refiner including aluminum-titanium-vanadium-boron (Al—Ti—V—B), and/or a die cast tool with an increased cooling rate to improve feeding efficiency.

Figure 1:
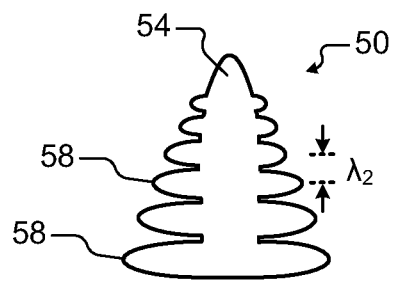
FIG. 1 illustrates an example of aluminum (Al) dendrite formed during casting.

Referring now to FIG. 1, aluminum (Al) dendrites 50 are formed during casting. The Al dendrites include a primary arm 54 and secondary arms 58. Spacing ($\lambda_2$) between the secondary arms 58 is referred to as second dendrite arm spacing (SDAS), which is a good indicator of a cooling rate of the Al of the cast wheel.

Figure 2A:
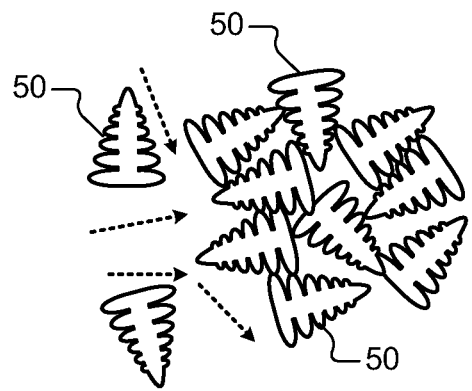
FIGS. 2A and 2B illustrate examples of groups of aluminum dendrites that form during casting.
Figure 2B:
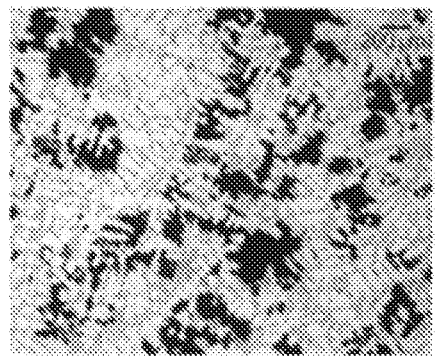

Referring now to FIGS. 2A and 2B, groups of Al dendrites form during casting. Spoke regions of low pressure die cast (LPDC) Al wheels show a high percentage of casting defects due to insufficient feeding efficiency of the melt. When the Al dendrites 50 have large grain sizes, the Al dendrites 50 reduce the flow efficiency of the melt within the die. Insufficient feeding efficiency leads to shrinkage porosity. Shrinkage porosity acts a crack initiator.

In addition, mechanical properties of the spoke region are sensitive to impurity iron (Fe) content. Impurity Fe combines with aluminum and silicon (Si) atoms to form a Fe-rich phase that acts as a crack initiator in deformation (e.g., degrading fracture toughness, ductility, and/or fatigue durability of the cast aluminum wheels). In addition, a slower cooling rate leads to a coarse Fe-rich phase, which impedes feeding of the melt. This, in turn, leads to larger shrinkage porosity and degraded mechanical properties of the cast Al wheels.

Increased sustainability and reduced energy consumption are strong incentives for increasing the use of Al scrap when manufacturing cast Al wheels. However, the scrap Al tends to have higher levels of impurity Fe content. Typically, LPDC Al wheels are limited to less than 0.15% Fe content, which limits the use of Al scrap which typically has a higher Fe content.

Methods for casting Al wheels according to the present disclosure improve feeding efficiency of the melt to reduce shrinkage porosity and/or reduce sensitivity of mechanical properties of the Al wheel to Fe content. More particularly, the methods for casting Al wheels according to the present disclosure use increased silicon content, a grain refiner (e.g., aluminum-titanium-vanadium-boron (Al—Ti—V—B)), and/or a die cast tool with an increased cooling rate to improve feeding efficiency.

The increased silicon content reduces the solidus temperature and increases a flow length before solidification ends. In addition, the grain refiner adds inoculant particles to provide nucleation substrates for aluminum grains. In some examples, the die cast tool can be made using tooling steel with increased thermal conductivity to provide more uniform temperature in various locations of the die during casting. As a result, the melt can flow more efficiently through the die before solidifying since cold spots and/or large temperature gradients in the die are reduced.

Aluminum wheels cast using LPDC typically use a grain refiner such as Al5Ti1B. However, the grain refiner Al5Ti1B tends to significantly increase grain sizes as the Si content increases. In contrast, the grain refiner Al—Ti—V—B reduces grain size with increasing Si content. For example, a first spoke cast using 7% Si content and Al5Ti1B with a secondary dendrite arm spacing (SDAS) of approximately 40 μm produced an average grain size of over 600 um. For example, a second spoke cast using 7% Si content and Al—Ti—V—B with a SDAS of approximately 40 μm produced an average grain size of over 400 um. For example, a third spoke cast using 9% Si content and Al—Ti—V—B with a SDAS of approximately 40 μm. In addition, the methods described herein have an average grain size that is less than 400 μm.

Cooling rate is another important enabler for significantly improving feeding efficiency. For example, a fourth spoke cast using 9% Si content and Al—Ti—V—B with a SDAS of approximately 20 μm produced an average grain size of less than 250 um. Grain size smaller than 250 um will be very desirable for reducing sensitivity of spoke region to Fe content.

Figure 3:
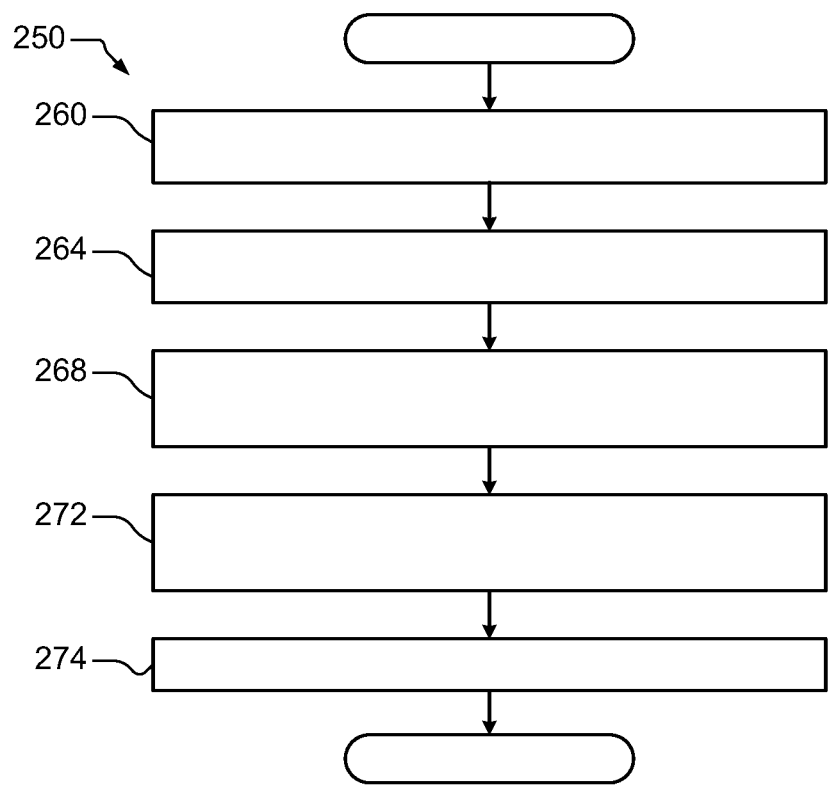
FIG. 3 is a flowchart of an example of a method for tilt casting an aluminum wheel according to the present disclosure.

Referring now to FIG. 3, a method 250 for tilt casting an aluminum wheel is shown. At 260, a melt is prepared at a desired chemistry. In some examples, the melt includes greater than 50%, 60%, or 70% scrap. At 264, the melt is degassed and refined. At 268, the grain refiner Al—Ti—V—B is added. A master alloy is added for eutectic Si modification. In some examples, the grain refiner Al—Ti—V—B includes V content greater than 1% in mass. In some examples, the master alloy comprises aluminum-strontium (Al—Sr). At 272, the Al wheel is tilt cast at a temperature in range from 680° C. to 720° C. At 274, the wheel is heat treated. For example, T6 heat treatment or other heat treatment may be performed.

Figure 4A:
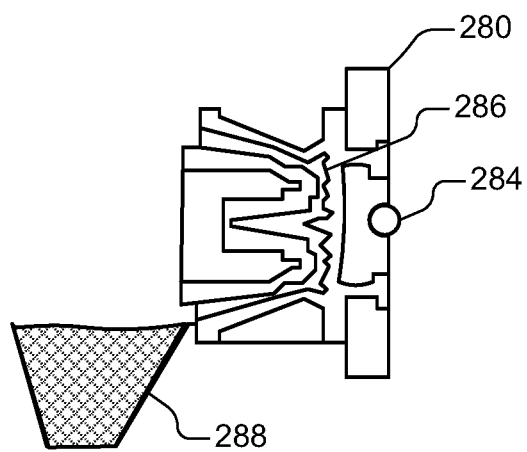
FIGS. 4A to 4C illustrate an example of tilt casting of the aluminum wheel of FIG. 3.
Figure 4B:
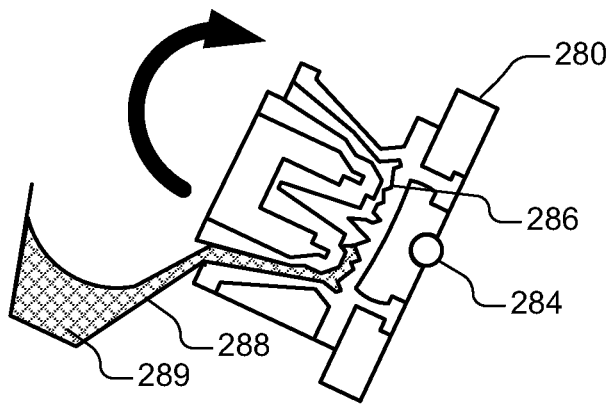
Figure 4C:
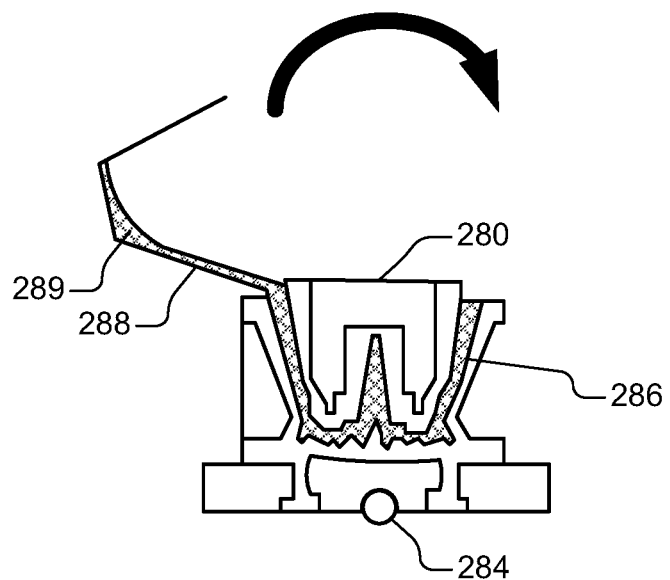
Figure 4D:
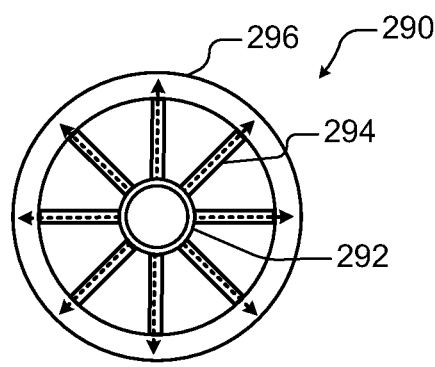
FIG. 4D illustrates an example of a solidification sequence from a hub to spoke to rim during tilt casting according to the present disclosure.

Referring now to FIGS. 4A to 4D, stages of tilt casting of the aluminum wheel are illustrated. A die 280 includes a die cavity 286 defining a shape of the Al wheel. The die 280 tilts relative to an axis 284. A container 288 includes a melt 289 having a predetermined chemistry described herein. In FIG. 4A, the die is tilted approximately 90° or another angle from a horizontal orientation. In FIG. 4B, the container 288 including the melt 289 delivers the melt to the die 280 as the die 280 is tilted back towards a horizontal orientation. In FIG. 4C, the container 288 including the melt 289 continues to deliver the melt to the die 280 as the die 280 reaches the horizontal position. In FIG. 4D, a solidification sequence of an Al wheel 290 proceeds from a hub 292 to spokes 294 to a rim 296 during tilt casting as indicated by arrows.

Figure 5:
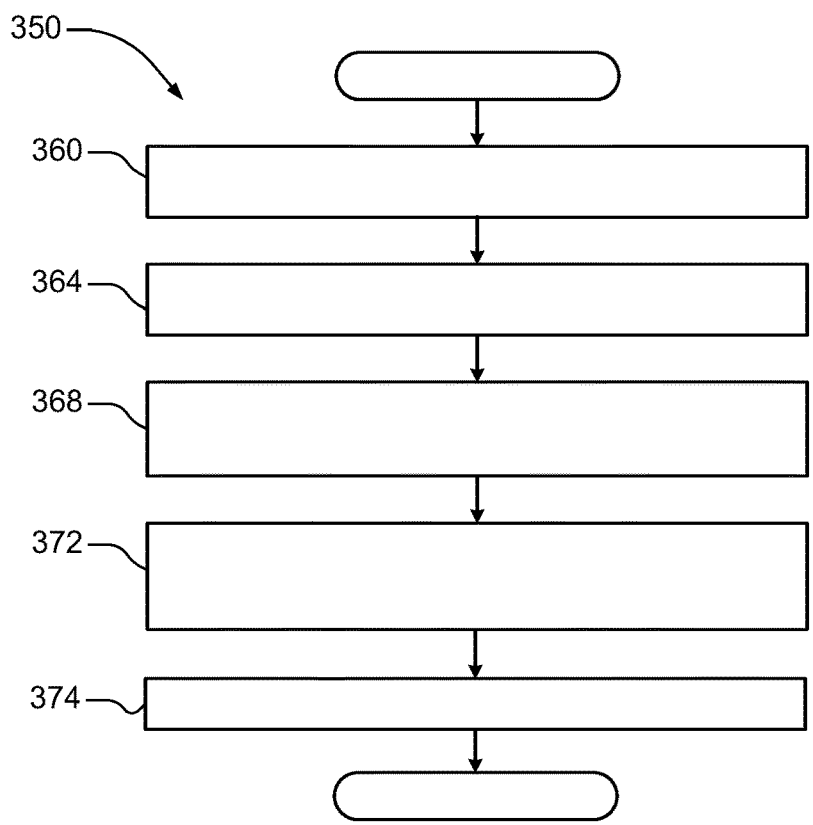
FIG. 5 is a flowchart of an example of a method for casting an aluminum wheel using low pressure die casting (LPDC) according to the present disclosure.

Referring now to FIG. 5, a method 350 for low pressure die casting (LPDC) an aluminum wheel is shown. At 360, a melt is prepared at a desired chemistry. In some examples, the melt includes greater than 50%, 60%, or 70% scrap. At 364, the melt is degassed and refined. At 368, the grain refiner Al—Ti—V—B is added, and the master alloy is added for eutectic Si modification. In some examples, the grain refiner Al—Ti—V—B includes V content greater than 1% in mass.

At 372, the Al wheel is cast using LPDC at a temperature in range from 680° C. to 720° C. At 274, the wheel is heat treated. For example, T6 heat treatment may be performed.

Referring now to FIGS. 6A to 6D, stages of LPDC of the aluminum wheel are illustrated. A die 410 includes a die cavity 416 defining a shape of the Al wheel. A lower portion 422 of the die 410 includes a cavity 424 where a melt 425 is heated and stored. The melt 425 has the predetermined chemistry described herein. A pressurized gas source 432 and a valve 434 selectively provide gas (e.g., such as clean dry air) to the cavity 424. The gas displaces the melt 425, which flows through a tube 426 into the die cavity 416.

Figure 6A:
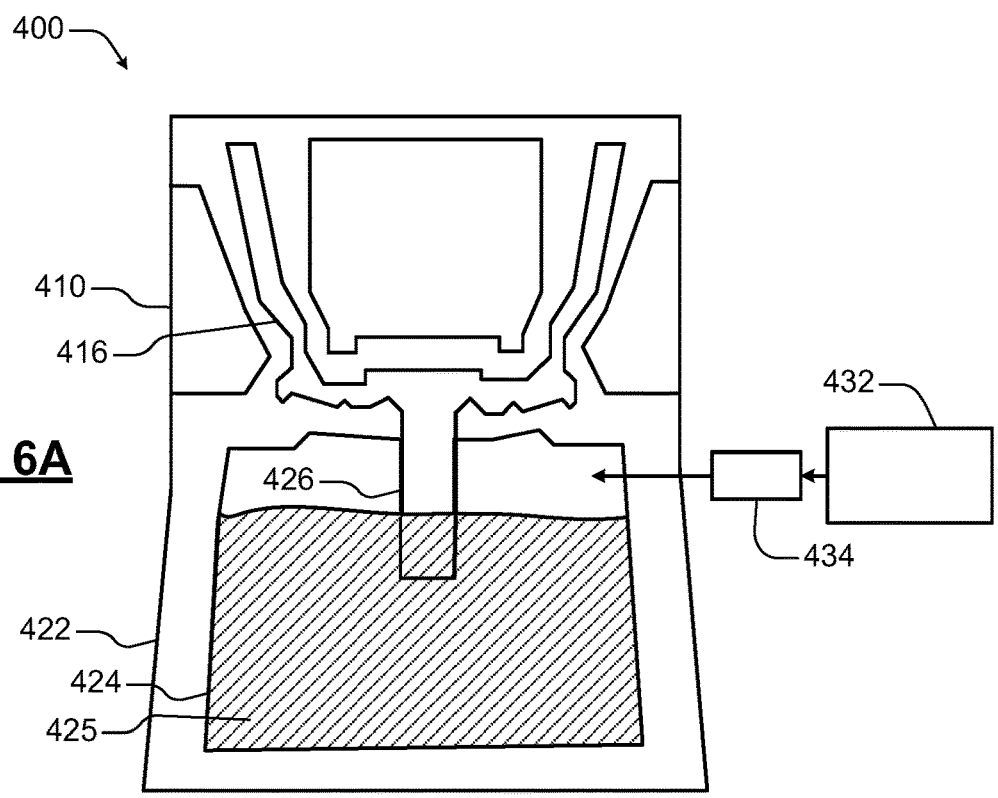
FIGS. 6A to 6C illustrate an example of LPDC of the aluminum wheel of FIG. 5.
Figure 6B:
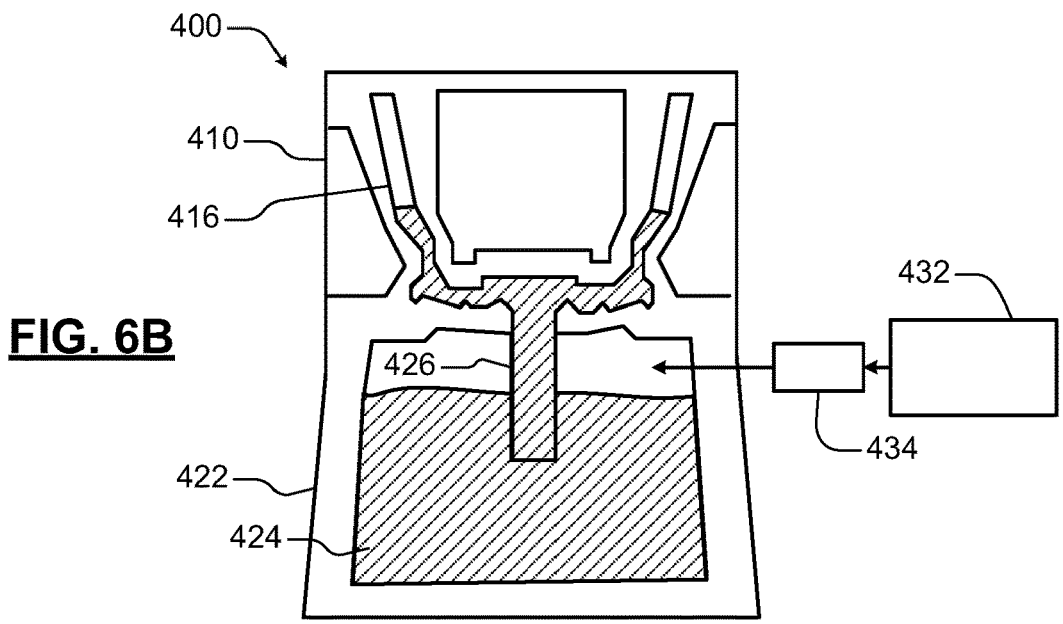
Figure 6C:
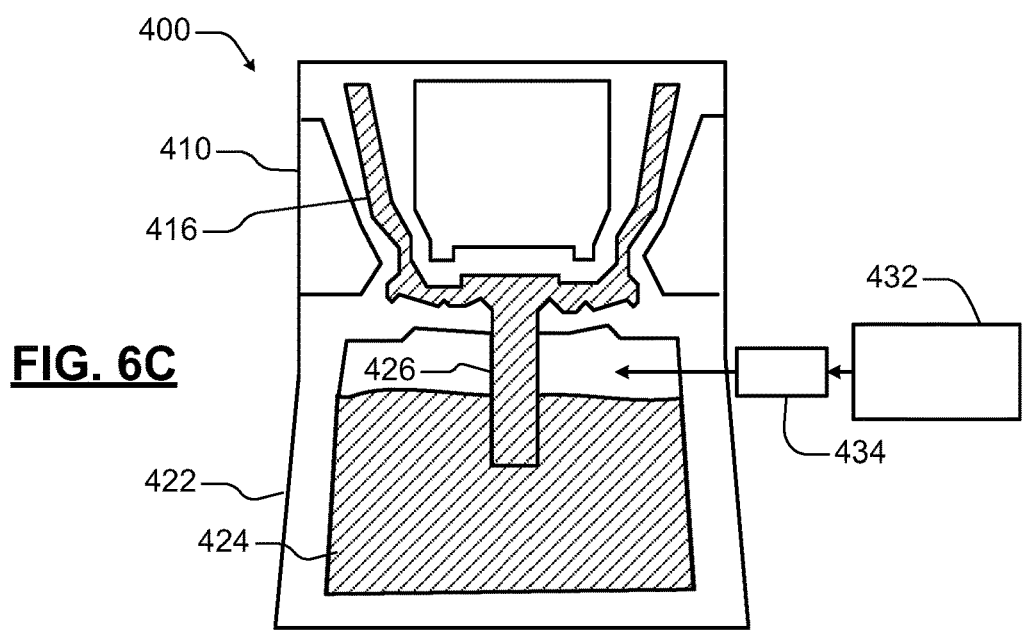
Figure 6D:
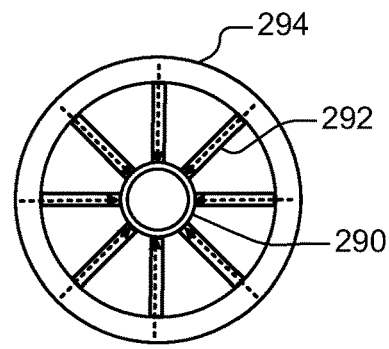
FIG. 6D illustrates an example of a solidification sequence from rim to spoke to hub during LPDC according to the present disclosure.

In FIG. 6A, the die 410 is shown before the gas is supplied and no melt has entered the die cavity 416. In FIG. 6B, the die 410 is shown after the gas is supplied and the melt has partially entered the die cavity 416. In FIG. 6C, the die 410 is shown after the gas is supplied and the melt has filled the die cavity 416. In FIG. 6D, a solidification sequence of the Al wheel 290 proceeds from the rim 296 to the spokes 294 to the hub 292 during LPDC.

Normal tooling steel, like H13, has a thermal conductivity that is less than 30 W/mK over a typical temperature range of the die. In some examples, the die utilizes high thermal conductivity tooling steel having a thermal conductivity that is greater than 32 W/mK or even 40 W/mK over a typical temperature range of the die. Examples, the high thermal conductivity tooling steel include HCTS® available from Rovalma.

In some examples, the composition of the wheel includes silicon (Si) in a range from 8.5 to 10.0% mass, magnesium (Mg) in a range from 0.25 to 0.4% mass, iron (Fe) in a range from 0.1 to 0.25% mass, copper (Cu) in a range from 0.01 to 0.2% mass, zinc (Zn) in a range from 0.01 to 0.2% mass, titanium (Ti) in a range from 0.01 to 0.2% mass, strontium (Sr) in a range from 10 ppm to 200 ppm, chromium (Cr) in a range from 0.01 to 0.2% mass, manganese (Mn) in a range from 0.01 to 0.2% mass, vanadium (V) in a range from 0.03 to 0.05% mass, and Al balanced (and/or in a range from 88.3 to 91.07% mass).

In other examples, the composition of the wheel includes silicon (Si) in a range from 8.5 to 9.5% mass, magnesium (Mg) in a range from 0.25 to 0.4% mass, iron (Fe) in a range from 0.15 to 0.25% mass, copper (Cu) in a range from 0.01 to 0.1% mass, zinc (Zn) in a range from 0.01 to 0.1% mass, titanium (Ti) in a range from 0.01 to 0.15% mass, strontium (Sr) in a range from 50 ppm to 200 ppm, chromium (Cr) in a range from 0.01 to 0.15% mass, manganese (Mn) in a range from 0.01 to 0.15% mass, vanadium (V) in a range from 0.03 to 0.05% mass, and aluminum (Al) balanced and/or in a range from 89.15 to 91.02% mass).

In some examples, the spoke region of the wheel has an average secondary dendrite arm spacing (SDAS) in a range from 20 μm to 30 μm. In some examples, the spoke region of the wheel has an average grain size in a range from 50 μm to 250 μm. In some examples, mechanical properties in the spoke region of the wheel has a yield strength greater than 170 MPa and an elongation to fracture greater than 3% mass.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method for casting an aluminum wheel including a hub, a rim, and a plurality of spokes connected the hub to the rim, the method comprising:
    preparing a melt having a predetermined chemistry and including silicon in a range from 8.5 to 10% mass, iron (Fe) in a range from 0.1 to 0.25% mass, and aluminum comprising greater than or equal to 70% mass scrap aluminum;
    degassing and refining the melt;
    adding a grain refiner including aluminum-titanium-vanadium-boron (Al—Ti—V—B) and a master alloy to the melt; and
    casting the aluminum wheel,
    wherein the aluminum wheel has an average grain size of a spoke region in a range from 50 μm to 250 μm.

2. The method of claim 1, wherein the melt comprises greater than 70% mass scrap aluminum.

3. The method of claim 1, wherein casting the aluminum wheel includes tilt casting the aluminum wheel at a predetermined temperature in a range from 680° C. to 720° C.

4. The method of claim 1, wherein:
    casting the aluminum wheel includes low pressure die casting (LPDC) the aluminum wheel at a predetermined temperature in a range from 680° C. to 720° C.; and a die configured to cast the aluminum wheel is made of a tooling steel having a thermal conductivity greater than 32 in a temperature range from 200° C. to 600° C.

5. The method of claim 1, wherein the melt includes greater than 300 parts per million vanadium.

6. The method of claim 1, wherein the melt further includes:
magnesium (Mg) in a range from 0.25 to 0.4% mass;
copper (Cu) in a range from 0.01 to 0.2% mass;
zinc (Zn) in a range from 0.01 to 0.2% mass;
titanium (Ti) in a range from 0.01 to 0.2% mass;
strontium (Sr) in a range from 10 ppm to 200 ppm;
chromium (Cr) in a range from 0.01 to 0.2% mass;
manganese (Mn) in a range from 0.01 to 0.2% mass; and
vanadium (V) in a range from 0.03 to 0.05% mass.

7. The method of claim 1, wherein the melt further includes:
magnesium (Mg) in a range from 0.25 to 0.4% mass;
copper (Cu) in a range from 0.01 to 0.1% mass;
zinc (Zn) in a range from 0.01 to 0.1% mass;
titanium (Ti) in a range from 0.01 to 0.15% mass;
strontium (Sr) in a range from 50 ppm to 200 ppm;
chromium (Cr) in a range from 0.01 to 0.15% mass;
manganese (Mn) in a range from 0.01 to 0.15% mass; and
vanadium (V) in a range from 0.03 to 0.05% mass.

8. The method of claim 1, wherein the aluminum wheel has an average secondary dendrite arm spacing (SDAS) in a range from 20 µm to 30 µm in a spoke region.

9. The method of claim 1, wherein a tensile sample cut from a spoke region of the aluminum wheel has a yield strength greater than 170 MPa and tensile elongation greater than 3%.

10. The method of claim 1, wherein the aluminum wheel has:
an average secondary dendrite arm spacing (SDAS) of the spoke region in a range from 20 µm to 30 µm;
a yield strength greater than 170 MPa; and
an elongation to fracture greater than 3%.

11. An aluminum wheel comprising:
a hub;
a rim; and
a plurality of spokes connected the hub to the rim,
wherein the aluminum wheel is cast and includes:
silicon (Si) in a range from 8.5 to 10% mass;
iron (Fe) in a range from 0.1 to 0.25% mass; and
aluminum comprising greater than or equal to 70% mass scrap aluminum, and
wherein the aluminum wheel has an average grain size of a spoke region in a range from 50 µm to 250 µm.

12. The aluminum wheel of claim 11, wherein the aluminum wheel further includes:
magnesium (Mg) in a range from 0.25 to 0.4% mass;
copper (Cu) in a range from 0.01 to 0.2% mass;
zinc (Zn) in a range from 0.01 to 0.2% mass;
titanium (Ti) in a range from 0.01 to 0.2% mass;
strontium (Sr) in a range from 10 ppm to 200 ppm;
chromium (Cr) in a range from 0.01 to 0.2% mass;
manganese (Mn) in a range from 0.01 to 0.2% mass; and
vanadium (V) in a range from 0.03 to 0.05% mass.

13. The aluminum wheel of claim 12, wherein the silicon (Si) is in a range from 8.5 to 9.5% mass.

14. The aluminum wheel of claim 11, wherein the aluminum wheel further includes:
magnesium (Mg) in a range from 0.25 to 0.4% mass;
copper (Cu) in a range from 0.01 to 0.1% mass;
zinc (Zn) in a range from 0.01 to 0.1% mass;
titanium (Ti) in a range from 0.01 to 0.15% mass;
strontium (Sr) in a range from 50 ppm to 200 ppm;
chromium (Cr) in a range from 0.01 to 0.15% mass;
manganese (Mn) in a range from 0.01 to 0.15% mass; and
vanadium (V) in a range from 0.03 to 0.05% mass.

15. The aluminum wheel of claim 11, wherein the aluminum wheel has an average secondary dendrite arm spacing (SDAS) of the spoke region in a range from 20 µm to 30 µm.

16. The aluminum wheel of claim 11, wherein the aluminum wheel has a yield strength greater than 170 MPa.

17. The aluminum wheel of claim 11, wherein the aluminum wheel has at least one of:
a yield strength greater than 200s MPa; and
an elongation to fracture greater than 3%.

18. The aluminum wheel of claim 11, wherein the aluminum wheel has an elongation to fracture greater than 3%.

19. The aluminum wheel of claim 11, wherein the aluminum wheel has:
an average secondary dendrite arm spacing (SDAS) of the spoke region in a range from 20 µm to 30 µm;
a yield strength greater than 170 MPa; and
an elongation to fracture greater than 3%.

20. The aluminum wheel of claim 11, wherein the aluminum wheel is a low pressure die cast aluminum wheel.

* * * * *